Patented Dec. 15, 1953

2,662,907

UNITED STATES PATENT OFFICE 2,662,907

PROCESS OF MAKING REFINED SUGAR CANE WAX

Albert C. Henn, Linden, and Harry W. Peterson, Jr., Somerville, N. J., assignors to Standard Oil Development Company, a corporation of Delaware No Drawing. Application October 27, 1950, Serial No. 192,607

4 Claims. (Cl. 260—412.5)

This invention relates to the preparation of light-colored hard wax products from clarification muds of sugar cane factories.

In the preparation of sugar from sugar cane the cane is crushed to yield a crude juice. This juice contains a large amount of impurities and is usually treated with lime to neutralize the natural acidity of the juices and precipitate many colloidal impurities. The juice is then settled and separated from the mud. The mud is then acidified to remove the lime and extracted with an organic solvent such as hexane to recover crude sugar cane wax.

This crude wax represents three principal components which are basically different in physical and chemical characteristics. The first or fatty fraction is a soft, dark green material at room temperature. The second or waxy fraction is a brittle, brown wax-like substance with a melting point of 75 to 80° C. The third or resinous fraction is a black pitch-like material with no definite melting point and containing organically combined phosphates.

The wax portion is similar to carnauba wax and is useful in making polishes, carbon paper, printing inks, finishing materials, dielectric materials and other products. The non-wax portion may serve as a source of crystalline alcohols, glycerine, fatty and wax acids and other products. It is thus important that each of these materials be prepared in as pure a form as possible. In the past it has been the custom to extract the crude wax from the mud with hydrocarbon solvents, and then purify the crude wax by selective extraction with other solvents such as acetone to remove the acids and with low-boiling alcohols to separate the wax from the resinous material.

It has now been found that a more efficient recovery of the refined wax portion can be obtained by the use of isopropyl alcohol as the sole solvent for extracting the crude wax from the mud and for preparing the refined wax from the crude wax.

According to one embodiment of this invention the sugar cane mud is extracted with concentrated (99%) isopropyl alcohol at temperatures between 40 and 50° C. to remove the fatty acids. The mud, substantially free of fatty acids, is extracted in a second step with an excess of boiling 99% isopropyl alcohol, filtered hot and the filtrate cooled to precipitate the wax. Since the resinous fraction is substantially insoluble in hot alcohol the wax is obtained in a very pure form.

According to another embodiment of this invention the sugar cane mud is extracted with hot isopropyl alcohol (99%) and cooled by dilution with water to precipitate the wax. Best results are obtained by using three parts of water to one part of filtrate. Since the alcohol does not extract the resinous fraction, the value of the extracted mud as a fertilizer is enhanced by this method since the resin contains organically combined phosphates which increase the phosphate-nitrogen ratio.

The advantages of the invention will be better understood from a consideration of the following experimental data which are given for the sake of illustration but with no intention of limiting the invention thereto:

Example 1

Separate samples of sugar cane mud were extracted with hexane and with 99% isopropyl alcohol.

The crude wax obtained by extraction of the mud with hexane was segregated into its components as follows:

The crude wax was heated with an excess of isopropyl alcohol to effect complete solution of the mixture. The wax-solvent mixture was then filtered through a heat-jacketed funnel to separate the pitch which is insoluble in hot alcohol. Hot filtration is necessary to prevent any precipitation of the wax.

Separation of the wax from the filtrate was accomplished by cooling to 5° C. to precipitate the wax and filtering. The filter cake wax was taken up in hot alcohol several more times, cooled and precipitated. The combined filtrates from the above were flash distilled to recover the soft fraction.

The sample extracted with isopropyl alcohol as the sole solvent was first heated with the alcohol at 40–50° C. to separate out the fatty material. The hard, light-colored, high melting point wax was recovered by a second extraction with hot isopropyl alcohol (99%).

The second extraction was accomplished by contacting sugar cane mud, substantially free of the soft fraction, with an excess of hot alcohol and allowing the solution to reflux for a period of thirty minutes. The wax-solvent mixture was immediately filtered at room temperature. A portion of the wax was precipitated and recovered from the filter medium. The resultant filtrate was cooled to a temperature of +10 to 0° C. The remaining filtrate was flashed distilled (80–85%) evaporated, and dried to recover additional wax. To effect complete removal of the wax this procedure was repeated under similar conditions using lesser amounts of isopropyl alcohol.

Having presumably exhausted the sugar cane mud, the extracted material was dried and subjected to further extraction with hexane to determine the efficiency of the alcohol extraction. These data indicated a 95-97% recovery of extractable material with isopropanol. The alcohol insoluble pitch fraction represented a major portion of the unrecovered material extracted with hexane.

The following data were obtained by the above procedures:

|  | Hexane | (99) Isopropanol |
|---|---|---|
| Amt. of mud extracted | 250 gms | 250 gms. |
| Weight of crude yield | 25.2 gms | 41.6 gms. |
| Weight percent extracted | 10.08% | 16.64%. |
| Weight percent wax | 2.2% [1] | 4.76%. |
| Weight percent fatty fraction | 4.32% | 11.88%. |
| Weight percent pitch | 3.7% |  |
| M. P. of wax, °C | 74° C | 76° C. |
| Wax (color) | Dark brown | Light yellow. |
| Fatty fraction (color) | Dark green | Black-green. |
| Physical appearance | Hard, brittle |  |

[1] Low-evidenced by the physical appearance of the soft fraction which contained an appreciable amount of wax (poor separation).

The above data indicate clearly that a greater yield of a purer, lighter colored wax is obtained by the use of isopropyl alcohol as the sole extracting agent than is obtained by the use of hexane.

*Example 2*

A 500 gram quantity of sugar cane mud was extracted with a total of 7000 ml. of 99% isopropyl alcohol as follows:

1. 3000 ml. (99%) IPOH—refluxed 1 hr.—filtered.
2. 2000 ml. (99%) IPOH—refluxed 1 hr.—filtered.
3. 2000 ml. (99%) IPOH—refluxed 1 hr.—filtered.

The combined filtrates from 1, 2, and 3 were blended together. To remove the bulk of the wax present in the filtrate, varying amounts of filtrate and water were blended at room temperature (approximately 25° C.) to precipitate the waxy portion.

The following data illustrate the fact that three volumes of water per volume of filtrate are necessary to recover the maximum amount of wax:

|  | Percent of wax (in alcoholic filtrate) recovered by precipitation with water | Filtrate (after wax removed by filtration) contains— |
|---|---|---|
| 3 pts. vol. alcoholic filtrate<br>1 pt. vol. water | 47 | Fatty acids and wax. |
| 1 pt. vol. alcoholic filtrate<br>1 pt. vol. water | 81 | Fatty acids and some wax. |
| 1 pt. vol. alcoholic filtrate<br>3 pts. vol. water | 98 | Substantially all fatty acids. |

The nature of the present invention having been thus fully set forth and specific examples of the same given, what is claimed as new and useful and desired to be secured by Letters Patent is:

1. A process for obtaining a refined wax from sugar-cane mud which comprises contacting the mud with boiling 99° isopropyl alcohol whereby the wax and fatty constituents are extracted from the mud, separating the resulting alcohol extract from the mud, diluting the separated extract with water to precipitate the wax from solution, and separating said wax from the water and alcohol mixture containing the fatty constituents.

2. Process as in claim 1 in which the alcohol extract is diluted with at least 3 volumes of water per volume of alcohol extract.

3. The process for obtaining refined wax from sugar-cane clarification mud which comprises extracting the fatty constituents from the mud with 99% isopropyl alcohol at a temperature between 40 and 50° C., separating the alcohol extract from the resulting residue at a temperature be- 40 and 50° C., extracting the residue with boiling 99% isopropyl alcohol, separating the hot alcohol extract from the residue, cooling the hot alcohol extract to precipitate the wax from solution, and separating said wax from the cooled alcohol.

4. Process as in claim 3, in which the wax is precipitated from the hot alcohol extract by cooling said alcohol extract to a temperature of about 0 to 10° C.

ALBERT C. HENN.
HARRY W. PETERSON, Jr.

References Cited in the file of this patent

UNITED STATES PATENTS

| Number | Name | Date |
|---|---|---|
| 2,391,893 | Goepfert | Jan. 1, 1946 |
| 2,430,012 | Goepfert | Nov. 4, 1947 |
| 2,476,974 | Goepfert | July 26, 1949 |
| 2,524,037 | Beckel et al. | Oct. 3, 1950 |
| 2,584,108 | Beckel et al. | Feb. 5, 1952 |

OTHER REFERENCES

Royal T. Balch, "Wax and Fatty Byproducts from Sugarcane." Technological Report Series No. 3, Sugar Research Foundation, Inc. 24, New York. October 1947, pages 13, 15, 16, 24, 25.